United States Patent Office 2,730,522
Patented Jan. 10, 1956

2,730,522
COBALT-CONTAINING MONOAZO DYESTUFFS

Guido Schetty, Basel, Switzerland, assignor to J. R. Geigy A. G., Basel, Switzerland, a Swiss firm No Drawing. Application January 2, 1953, Serial No. 329,459

Claims priority, application Switzerland January 5, 1952

7 Claims. (Cl. 260—147)

Water soluble, chrome-containing monoazo dyestuffs are described in U. S. Patent No. 2,551,056 and in the applicant's copending patent application Serial No. 298,827, filed July 14, 1952, which are derived from those o.o'-dihydroxydyestuffs which contain no acid groups rendering them water soluble but which, on the other hand are substituted by at least one low molecular alkylsulphonyl group having at most 5 carbon atoms. It is due to this alkylsulphonyl group that these complex chrome compounds are suitable for the fast and level dyeing of wool and similar synthetic fibres from an aqueous neutral to weakly acid dyebath.

On further work being done on the subject of the invention, it has now been found that these o.o'-dihydroxy monoazo dyestuffs which have no acid water-solubilising groups of the general formula:

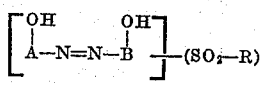

can be converted by treatment with agents givng off cobalt into water soluble complex cobalt compounds which are also valuable dyestuffs for the fast and level dyeing of wool and similar synthetic fibres from a neutral to weakly acid aqueous dyebath. In the above formula:

A represents the radical of an o-hydroxydiazo component,
B represents the radical of an azo component coupling in a neighbouring position to a phenolic or enolic hydroxyl group, and
R represents a low molecular aliphatic hydrocarbon radical.

The alkyl sulphonyl groups are aromatically bound and the radicals A and B may contain non-ionogenic substituents. In particular, these complex cobalt compounds differ from the comparable complex chrome compounds in that they generally have a new shade, generally strongly shifted towards the hypsochrome and they are distinguished by an even better fastness to light.

The monoazo dyestuffs usable according to this invention are characterised by the absence of acid water-solubilising groups such as carboxyl and sulphonic acid groups and by the presence of at least one aromatically bound low molecular alkyl-sulphonyl group which may be either in the diazo or in the coupling component. It is the presence of this particular alkylsulphonyl group which makes the complex cobalt compounds according to this invention sufficiently water soluble. The diazo and coupling components containing alkylsulphonyl groups can be used for the production of suitable o.o'-dihydroxy monoazo dyestuffs, e. g. 4-methylsulphonyl-, 4-ethylsulphonyl, 4-n- or i.-propylsulphonyl-, 4-n.-butyl-sulphonyl- and 4-amylsulphonyl-2-amino-1-phenols and acetoacetylaminobenzene-alkyl sulphones, 1-alkylphenyl-sulphonyl-3-methyl-5-pyrazolones, 1-hydroxy-3- or -5-alkylsulphonyl- and 2-hydroxy-6-alkylsulphonyl-naphthalenes and derivatives thereof substituted in the aromatic rings by non-ionogenic substituents such as halogen, methyl, nitro-, acylamino groups, etc. Naturally, also all those diazo and coupling components which have no acid water-solubilising groups but which, however, may be substituted by non-ionogenic substituents, previously used for the production of o.o'-dihydroxy dyestuffs can be used in the combinations with at least one alkylsulphonyl group as defined according to this invention. o-Aminophenols, o-aminonaphthols, acetoacetanilides, pyrazolones, 2.4-dihydroxyquinolines, phenols, naphthols, etc. come into consideration.

The monoazo dyestuffs usable according to this invention are metallised by treating them with agents giving off cobalt, e. g. with soluble cobalt salts of inorganic or, advantageously, organic acids such as cobalt chloride, cobalt sulphate or cobalt acetate. Metallisation is performed, for example, in aqueous solution or suspension at a raised temperature, and if desired, in the presence of inert organic solvents such as low alcohols and of mineral acid neutralisers or acid binding agents such as alkali acetates or carbonates at either normal or increased pressure. The agent giving off cobalt should be used in such amounts that there is at least 1 cobalt atom to every two molecules of dyestuff. To ensure that the end products are sufficiently water soluble, they can be mixed with sufficient amounts of alkali carbonate or phosphate and, if desired, with capillary active dispersing agents.

As well as for the fast and level dyeing from a weakly acid to neutral dyebath of wool and synthetic fibres similar thereto composed of superpolyamides, superpolyurethanes and casein, the new dyestuffs are also suitable for the dyeing of silk and leather. The dyeings produced with the cobalt-containing dyestuffs according to this invention have excellent fastness to light.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

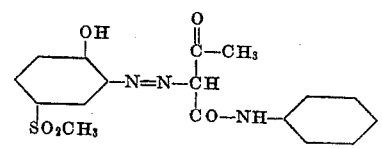

18.7 parts of 2-amino-1-hydroxybenzene-4-methyl sulphone are dissolved in 17 parts of concentrated hydrochloric acid and 150 parts of water and diazotised at 5° with 6.9 parts of sodium nitrite. The diazo suspension is neutralised with sodium bicarbonate and then 3 parts of sodium bicarbonate are added. A solution of 18.6 parts of acetic acid anilide in 250 parts of water and 11.4 parts by volume of 10 N-caustic soda lye is added, the whole is heated at 65° for 30 minutes and the dyestuff is precipitated by the addition of 20 parts by volume of 10 N-hydrochloric acid. It is filtered off, washed until the washing water is neutral and then stirred into 500 parts of water. 60 parts of cobalt acetate (corresponding to 3.54 parts of Co) and 5.5 parts of anhydrous soda are then added and the whole is heated for 15 hours at 80–90°. 700 parts of a 25% sodium chloride solution are added and after cooling, the complex compound which precipitates is filtered off. After drying, a yellow brown powder is obtained which dyes wool very evenly from a weakly acid bath in dull yellow shades.

Example 2

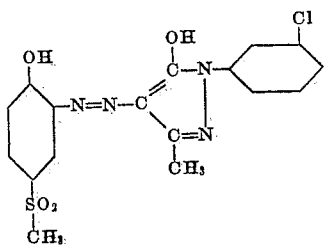

18.7 parts of 2-amino-1-hydroxybenzene-4-methyl sulphone are dissolved in 150 parts of water and 17 parts of concentrated hydrochloric acid and diazotised at 5° with an aqueous concentrated solution of 6.9 parts of sodium nitrite. The diazo compound precipitates in the form of clay-yellow coloured small crystals. The suspension is made neutral to litmus paper by the addition of sodium hydrogen carbonate, then 3 parts of sodium hydrogen carbonate are added and a solution of 21.9 parts of 1-(3'-chlorophenyl)-3-methyl-5-pyrazolone and 6 parts of sodium hydroxide in 200 parts of water are added. The whole is stirred without cooling until the formation of the dyestuff is complete, which is for about 5 hours, whereupon it is heated to 85° and the dyestuff, which precipitates almost quantitatively in crystal form, is filtered off hot. While still damp, the dyestuff is heated in 500 parts of water with 60 parts of cobalt acetate solution (corresponding to 3.54 parts of Co) for 1 hour at 80° after which 11 parts of anhydrous soda are added until there is an alkaline reaction to phenolphthalein and the whole is then stirred for 5 hours at 80–85°. 1000 parts of a 25% sodium chloride solution are added, the cobalt complex compound which precipitates is filtered off and dried. A brown powder is obtained which dissolves well in hot water and dyes wool from a neutral or weakly acid dyebath in orange yellow shades. The dyeings are distinguished by very good fastness to washing, milling and sea water and by excellent fastness to light.

If, instead of 18.7 parts of 2-amino-1-hydroxybenzene-4-methyl sulphone, 20.1 parts of 2-amino-1-hydroxybenzene-4-ethyl sulphone or 21.5 parts of 2-amino-1-hydroxybenzene-4-n.-propyl sulphone are used, dyestuffs are obtained which have a somewhat better drawing power from a neutral bath.

Example 3

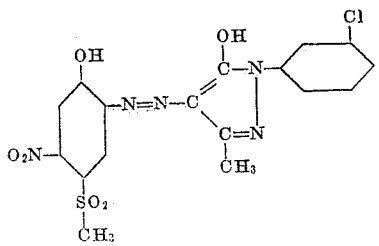

23.2 parts of 5-nitro-2-amino-1-hydroxybenzene-4-methyl sulphone are dissolved in 100 parts of water and 10 parts by volume of 10 N-caustic soda lye, a 33% sodium nitrite solution is added (corresponding to 6.9 parts of sodium nitrite) and the whole is poured within 1 hour at 4–8° into a solution of 28 parts of concentrated hydrochloric acid and 50 parts of water. The diazonium compound so obtained is coupled as described in Example 2 with 21.9 parts of 1-(3'-chlorophenyl)-3-methyl-5-pyrazolone. The dyestuff obtained is heated for 16 hours at 75–80° in 500 parts of water with 60 parts of cobalt acetate solution (corresponding to 3.54 parts of Co) and the cobalt complex compound which precipitates is filtered off and, after drying, is mixed with 30% of its weight of trisodium phosphate. The new cobalt-containing dyestuff dyes wool from a neutral or weakly acid bath in orange shades which have very good fastness to milling, sea water and light.

Example 4

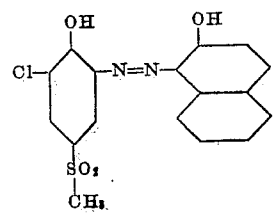

22.2 parts of 6-chloro-2-amino-1-hydroxybenzene-4-methyl sulphone are dissolved in 200 parts of hot water with 18 parts of concentrated hydrochloric acid, the solution is cooled to 5° and diazotised with 6.9 parts of sodium nitrite in 20 parts of water. On completion of the diazotisation, the suspension is neutralised with sodium hydrogen carbonate and then poured at 0–5° into a solution prepared from 15.1 parts of 2-hydroxynaphthalene, 400 parts of water, 10.5 parts by volume of 10 N-caustic soda lye and 15 parts of anhydrous soda. On completion of the formation of the dyestuff, it is filtered off, pasted in 500 parts of water at 80° and 60 parts of a cobalt acetate solution (corresponding to 3.54 parts of Co) are added. The whole is stirred at 80° and 1.7 parts of hydrogen peroxide in the form of a 3% solution are added dropwise within 1 hour. Stirring is continued for a further 5 hours at 80° whereupon the liquid is made alkaline to soda, and the cobalt-containing dyestuff is precipitated with common salt and filtered off. After drying, it is in the form of a dark brown powder which dyes wool from a neutral or weakly acid bath in wine red shades which have excellent fastness to light. The dyeings are distinguished by very good fastness to washing, milling, alkali and sea water.

If, instead of 22.2 parts of 6-chloro-2-amino-1-hydroxybenzene-4-methyl sulphone, 18.7 parts of 2-amino-1-hydroxybenzene-4-methyl sulphone are used, a dyestuff is obtained which does not draw quite so well from a neutral bath but dyes in somewhat more pure shades.

The following table gives some further examples which can be obtained by the process described in detail above.

| No. | Diazo component | Coupling component | Shade of the cobalt compound on wool |
|---|---|---|---|
| 1 | 2-amino-1-hydroxybenzene-4-methyl sulphone. | carbomethoxyaminonaphthol-(1.7). | violet. |
| 2 | ....do.... | 2-naphthol-6-methyl sulphone. | red. |
| 3 | ....do.... | 6-bromo-2-naphthol | wine red. |
| 4 | ....do.... | 5.8-dichloro-1-naphthol | red violet. |
| 5 | 6-nitro-2-amino-1-hydroxybenzene-4-methyl sulphone. | 2-naphthol | brownish violet. |
| 6 | 4-nitro-2-aminophenol | 1-(4'-methylsulphonylphenyl)-3-methyl-5-pyrazolone. | orange yellow. |
| 7 | 4-chloro-2-aminophenol | 2-hydroxynaphthalin-6-methyl sulphone. | ruby red. |
| 8 | 2-amino-1-phenol-4-ethyl sulphone. | 2-hydroxynaphthalene | wine red. |
| 9 | 2-aminophenol-4-butyl sulphone. | 3.4-dimethyl-1-phenol | brownish red. |
| 10 | 2-aminophenol-4-propyl sulphone | 3-acetylamino-4-methyl-1-phenol. | red. |

5. Dyeing example 2 parts of the dyestuff obtained according to Example 4 are dissolved in 3000 parts of water, 10 parts of Glaubers salt and 2 parts of ammonium sulphate are added. 100 parts of wool are entered at 50°, the bath is brought to the boil within half an hour and is kept at the boil for 1½ hours while moving the goods well. The goods are then rinsed and dried. The wool which has been dyed a wine red shade is very fast to washing, alkali, sea water and light.

What I claim is:
1. The complex cobalt compound of a monoazo dyestuff having the formula:

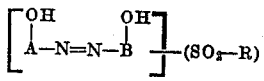

wherein A represents a benzene nucleus, containing the OH group in o-position to the azo group, B represents the radical of a member selected from the group consisting of phenolic, naphtholic, 5-pyrazolonic and acetoacetyl-anilidic coupling components, containing the OH-group in o-position to the azo group, R represents a low molecular alkyl radical, the alkyl sulphone group being bound aromatically and A and B being otherwise free from carboxylic acid and sulphonic acid groups.

2. The complex cobalt compound of a monoazo dyestuff having the formula:

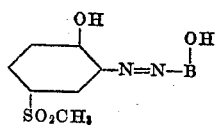

wherein B represents the radical of a member selected from the group consisting of phenolic, naphtholic, 5-pyrazolonic and acetoacetyl-anilidic coupling components containing the OH-group in o-position to the azo group and is otherwise free from carboxylic acid and sulphonic acid groups.

3. The complex cobalt compound of a monoazo dyestuff having the formula:

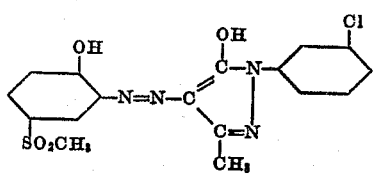

4. The complex cobalt compound of a monoazo dyestuff having the formula:

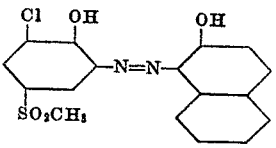

5. The complex cobalt compound of a monoazo dyestuff having the formula:

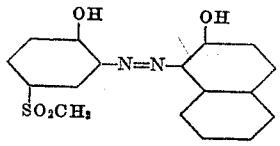

6. The complex cobalt compound of a monoazo dyestuff having the formula:

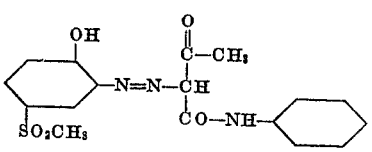

7. The complex cobalt compound of a monoazo dyestuff having the formula:

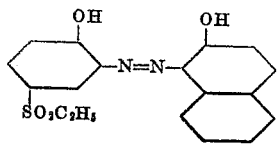

References Cited in the file of this patent
UNITED STATES PATENTS 2,443,226    Carson _____ June 15, 1948
2,551,056    Schetty _____ May 1, 1951

OTHER REFERENCES

Crossley: "Metallized Azo Dyes," American Dyestuff Reporter, March 7, 1938, pages 124–125.